(12) United States Patent
Lamothe

(10) Patent No.: US 12,480,591 B2
(45) Date of Patent: Nov. 25, 2025

(54) GAS CONTROL VALVE AND RELATED SYSTEMS AND ASSEMBLIES

(71) Applicant: Pneumadyne, LLC, Plymouth, MN (US)

(72) Inventor: Thomas Lamothe, Golden Valley, MN (US)

(73) Assignee: Pneumadyne, LLC, Plymouth, MN (US)

( * ) Notice: Subject to any disclaimer, the term of this patent is extended or adjusted under 35 U.S.C. 154(b) by 0 days.

(21) Appl. No.: 18/557,322

(22) PCT Filed: Apr. 13, 2022

(86) PCT No.: PCT/EP2022/059854
§ 371 (c)(1),
(2) Date: Oct. 26, 2023

(87) PCT Pub. No.: WO2022/228898
PCT Pub. Date: Nov. 3, 2022

(65) Prior Publication Data
US 2024/0209951 A1    Jun. 27, 2024

Related U.S. Application Data

(60) Provisional application No. 63/181,587, filed on Apr. 29, 2021.

(51) Int. Cl.
*F16K 24/04* (2006.01)
*F16K 17/28* (2006.01)

(52) U.S. Cl.
CPC .......... *F16K 24/046* (2013.01); *F16K 17/285* (2013.01)

(58) Field of Classification Search
CPC .... F16K 24/046; F16K 24/06; F16K 27/0245; F16K 17/285; F16K 15/04;
(Continued)

(56) References Cited

U.S. PATENT DOCUMENTS

| 4,162,974 A | 7/1979 | Pernic et al. |
| 4,175,558 A | 11/1979 | Mittleman et al. |

(Continued)

FOREIGN PATENT DOCUMENTS

| CA | 1087106 A | 10/1980 |
| CN | 1807940 A | 7/2006 |

(Continued)

OTHER PUBLICATIONS

Machine English translation of DE202006007789 (Year: 2024).*
(Continued)

*Primary Examiner* — Hailey K. Do
(74) *Attorney, Agent, or Firm* — McDonnell Boehnen Hulbert & Berghoff LLP

(57) ABSTRACT

A valve (104) includes: a valve body (200) having a valve chamber (204), a seat (226) formed by an interior surface of the valve body, and one or more flow directing features (228, 230) formed about the seat; a float ball (224) disposed within the valve chamber, wherein the one or more flow directing features formed about the seat are configured to allow fluid flow therethrough when the float ball is seated at the seat; and a seal (216) disposed within the valve body, wherein when liquid enters the valve chamber and reaches a particular level within the valve chamber, the float ball is configured to float on the liquid until it reaches the seal, thereby sealing the valve chamber.

17 Claims, 11 Drawing Sheets

(58) Field of Classification Search
CPC ......... Y10T 137/3068; Y10T 137/3099; Y10T 137/7436
See application file for complete search history.

(56) References Cited

U.S. PATENT DOCUMENTS

| | | | |
|---|---|---|---|
| 5,002,230 | A | 3/1991 | Bonnerup et al. |
| 5,749,394 | A * | 5/1998 | Boehmer ................ F16K 15/04 137/533.15 |
| 2009/0139915 | A1 | 6/2009 | Conti et al. |
| 2010/0132805 | A1 * | 6/2010 | Kshirsagar .......... F16K 27/0245 137/202 |
| 2011/0220562 | A1 | 9/2011 | Beiriger |
| 2015/0300524 | A1 | 10/2015 | Konegger |
| 2019/0105584 | A1 | 4/2019 | Sasaki et al. |
| 2019/0338861 | A1 | 11/2019 | Otterbein |
| 2020/0116172 | A1 | 4/2020 | Sun |
| 2020/0179674 | A1 | 6/2020 | Egley et al. |

FOREIGN PATENT DOCUMENTS

| | | | | |
|---|---|---|---|---|
| CN | 201129494 | Y | 10/2008 | |
| CN | 203082356 | U | 7/2013 | |
| CN | 204226753 | U | 3/2015 | |
| CN | 204226754 | U | 3/2015 | |
| CN | 204226755 | U | 3/2015 | |
| CN | 106195382 | A | 12/2016 | |
| CN | 206973031 | U | 2/2018 | |
| CN | 108397591 | A | 8/2018 | |
| CN | 207697488 | U | 8/2018 | |
| CN | 207990183 | U | 10/2018 | |
| CN | 208107202 | U | 11/2018 | |
| CN | 209245267 | U | 8/2019 | |
| CN | 209340585 | U | 9/2019 | |
| CN | 111 322 442 | A | 6/2020 | |
| CN | 210890253 | U | 6/2020 | |
| CN | 211288769 | U | 8/2020 | |
| DE | 4232777 | A1 * | 3/1994 | ............ B65D 90/34 |
| DE | 202006007789 | U1 | 10/2006 | |
| DE | 202010009634 | U1 | 9/2010 | |
| DE | 10 2016 105025 | A1 | 9/2017 | |
| EP | 1 647 749 | A1 | 4/2006 | |
| EP | 2 728 189 | A1 | 5/2014 | |
| FR | 2 847 648 | A1 | 5/2004 | |
| GB | 964835 | A | 7/1964 | |
| GB | 2 028 976 | A | 3/1980 | |
| GB | 1568414 | | 5/1980 | |
| JP | H08 338547 | A | 12/1996 | |
| JP | 2002098250 | A | 4/2002 | |
| JP | 2016 102505 | A | 6/2016 | |

OTHER PUBLICATIONS

Machine English translation of DE4232777 (Year: 2024).*
Search Report issued by the Great Britain Patent Office in Application No. GB 2106395.3 dated Oct. 29, 2021.
Dual Air Valves, AL/PL Series, www.crispinvalve.com, Oct. 2001.
International Search Report and Written Opinion issued by the European Patent Office PCT/EP2022/059854 in Application No. dated Aug. 18, 2022.

* cited by examiner

GAS CONTROL VALVE AND RELATED SYSTEMS AND ASSEMBLIES

CROSS-REFERENCE TO RELATED APPLICATION

This application claims priority to U.S. Provisional Application No. 63/181,587, filed Apr. 29, 2021, the entire content of which is incorporated herein by reference.

BACKGROUND

Air release valves can be hydromechanical devices configured to release air and waste gases or admit air during the filling and draining of liquid piping systems. In example applications, it may be desirable to use an air release valve to allow air or other gases to escape a container while filling the container with fluid. It may also be desirable to allow air to fill the container as the container is being drained. It is with respect to these and other considerations that the disclosure made herein is presented.

SUMMARY

Within examples described herein, the present disclosure describes implementations that relate to a gas control valve and related systems and assemblies.

In a first example implementation, the present disclosure describes a gas control valve. The gas control valve includes: (i) a valve body having a valve chamber, a seat formed by an interior surface of the valve body, and one or more flow directing features; (ii) a float ball disposed within the valve chamber, wherein the one or more flow directing features are configured to allow fluid flow therethrough when the float ball is seated at the seat; and (iii) a seal disposed within the valve body, wherein when liquid enters the valve chamber and reaches a particular level within the valve chamber, the float ball is configured to float on the liquid until it reaches the seal, thereby sealing the valve chamber.

In a second example implementation, the present disclosure describes a system including a source of liquid; and an assembly comprising: a reservoir fluidly coupled to the source of liquid, and a gas control valve coupled to the reservoir and configured to allow gas to be released from the reservoir as the reservoir is being filled with liquid from the source of liquid, and allow gas to fill the reservoir as liquid is being drained from the reservoir. The gas control valve includes: a valve body comprising (i) a neck portion coupling the gas control valve to the reservoir, wherein the neck portion comprises a port configured to receive fluid from and provide fluid to the reservoir, (ii) a valve chamber, (iii) a seat formed by an interior surface of the valve body, and (iv) one or more flow directing features; a float ball disposed within the valve chamber, wherein the one or more flow directing features are configured to allow fluid flowing from or to the port to pass through the one or more flow directing features when the float ball is seated at the seat; a seal disposed within the valve body, wherein when liquid enters the valve chamber and reaches a particular level within the valve chamber, the float ball is configured to float on the liquid until it reaches the seal, thereby sealing the valve chamber; and a cap coupled to the valve body such that the cap encloses the valve chamber, wherein the cap comprises an opening configured to allow gas to flow therethrough into the valve chamber from an external environment of the gas control valve or allow gas to flow out of the valve chamber to the external environment.

In a third example implementation, the present disclosure describes a method of assembling the gas control valve of the first or second example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Disclosed herein is a gas control valve, which can also be referred to as a float valve or air/gas release valve, configured to allow gas to escape from a container or reservoir while the reservoir is being filled. The gas control valve also allows gas to fill the reservoir while draining the reservoir. An example gas control valve includes a two piece housing defining a valve chamber. The valve chamber may be closed at an upper end by a filter element.

A float ball is disposed within the valve chamber. The valve has flow directing features such as grooves formed at or about the seat where the float ball sits within the valve chamber. Such grooves allow gas to flow around the float ball to an external environment of the gas control valve without pushing the float ball off the seat. The float ball has a density that is less than a density of the liquid filling the reservoir. As such, the float ball moves off the seat when liquid rises within the reservoir, reaches the float ball, and coves a particular volume of the float ball, causing the ball to move or be lifted off the seat. The grooves also allow gas to flow into the reservoir while the float ball is seated when draining the reservoir.

In an example, a hard stop, such as a spacer, washer, or any protruding element in the valve body of the gas control valve, is provided to ensure that the float ball remains in the valve chamber in the event of unexpected pressure spikes.

In examples, the gas control valve can be used in medical applications such as dialysis machines. In these examples, the valve can be made of biocompatible materials suitable for such applications.

Figure 1A:
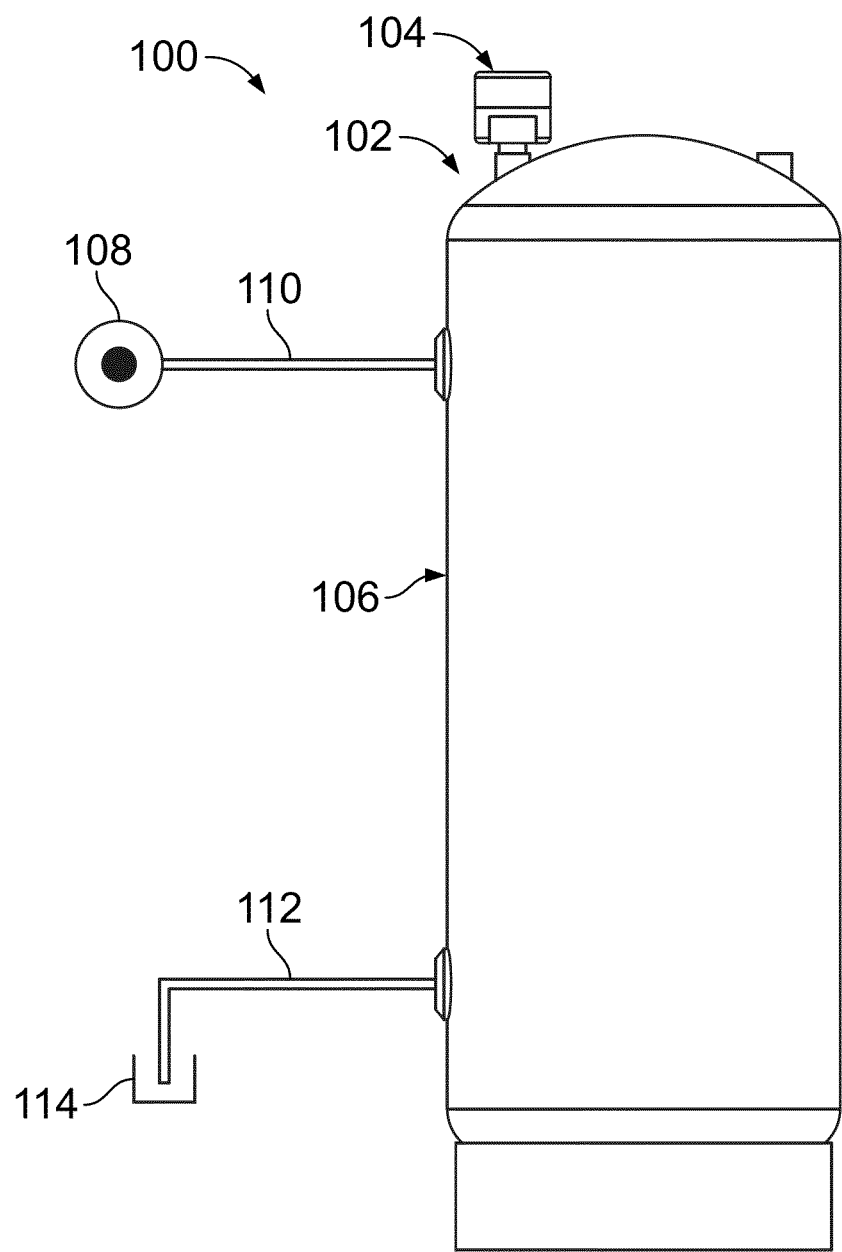
FIG. 1A illustrates a system having an assembly of a gas control valve and a reservoir with the gas control valve directly mounted to the reservoir, in accordance with an example implementation.

FIG. 1A illustrates a system 100 having an assembly 102 of a gas control valve 104 and a reservoir 106 with the gas control valve 104 directly mounted to the reservoir 106, in accordance with an example implementation.

The system 100 can include a source 108 of liquid configured to provide liquid via fluid line 110 (e.g., pipe, hose, tube, etc.) to the reservoir 106 to fill the reservoir 106 with the liquid. The source 108 can be, for example, a pump. Before filling the reservoir 106, the reservoir 106 may include gas, e.g., air. As the liquid fills the reservoir 106, gas is displaced by the liquid. The gas control valve 104 is configured to allow the gas to escape from the reservoir 106 when filling the reservoir 106.

In example, it may be also desirable to drain the reservoir 106. As such, another pump, or the same pump of the source 108, can draw liquid from the reservoir 106 via fluid line 112 and provide the drained liquid to a tank 114 (e.g., a waste tank).

As an example for illustration, the reservoir 106 can be used in a medical application such as a dialysis system. For instance, the reservoir 106 can be a reservoir used for mixing constituents of a dialysate or dialysis solution (e.g., acid solution, bicarbonate solution, and reverse osmosis water) that are used in a dialyzer of a dialysis machine.

In this example, the source 108 pumps liquids into the reservoir 106, and the gas control valve 104 ensures that any air in the reservoir 106 is vented to the atmosphere or external environment of the assembly 102 to preclude air from dissolving into the dialysate. After using the dialysis machine, it may also be desirable to drain the reservoir 106 to replace the liquid mix with fresh dialysate. In this example, as liquid is drained via the fluid line 112 to the tank 114, the gas control valve 104 enables air to enter the reservoir 106 to preclude generating a vacuum, which might cause damaging cavitation within the gas control valve 104 or the reservoir 106.

Air is used herein as an example, and any gas can be used. Also, a dialysis machine or any medical application is used herein as an example. It should be understood that the gas control valve 104 can be used with any system or device with a container or reservoir having an enclosed/sealed volume, where the enclosed/sealed volume is to be filled with a liquid while venting gas in the reservoir to an external environment or another chamber filled with a gas. The gas control valve 104 is also configured to allow gas to enter the enclosed/sealed volume while liquid is being drained therefrom.

FIG. 1A illustrates the gas control valve 104 directly mounted or coupled to the reservoir 106. However, in other example implementations. The gas control valve 104 is coupled to the reservoir 106 via a fluid line rather than being directly mounted to the reservoir 106.

Figure 1B:
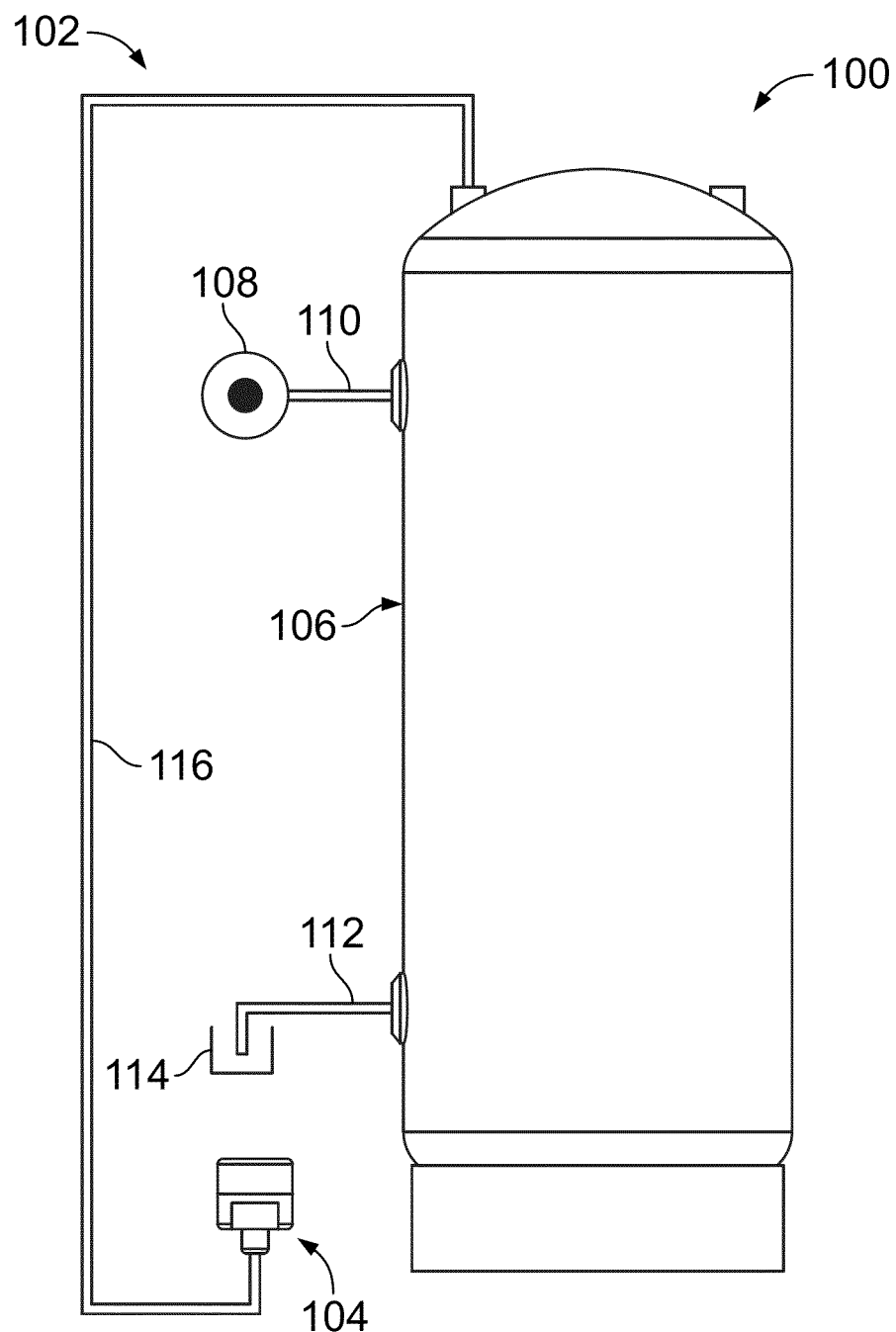
FIG. 1B illustrates the gas control valve of FIG. 1 being fluidly coupled to the reservoir via a fluid line, in accordance with an example implementation.

FIG. 1B illustrates the gas control valve 104 being fluidly coupled to the reservoir 106 via a fluid line 116, in accordance with an example implementation. Rather than the gas control valve 104 being directly mounted to the reservoir 106, the gas control valve 104 can be mounted away from the reservoir 106 and is fluidly coupled to the reservoir 106 via the fluid line 116, e.g., a tube, hose, pipe, etc. The fluid line 116 can have a fitting at a first end that couples the fluid line 116 to the gas control valve 104. The fluid line 116 can also have another fitting at a second end thereof that couples the fluid line 116 to the reservoir 106.

Figure 2:
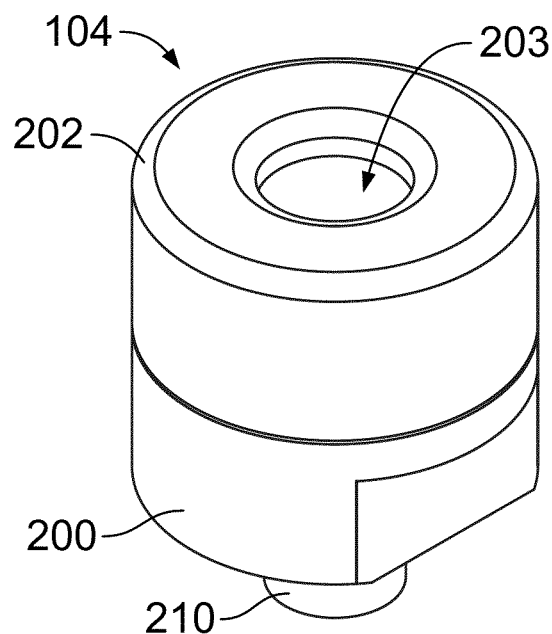
FIG. 2 illustrates a perspective view of the gas control valve shown in FIG. 1A-1B, in accordance with an example implementation.
Figure 3:
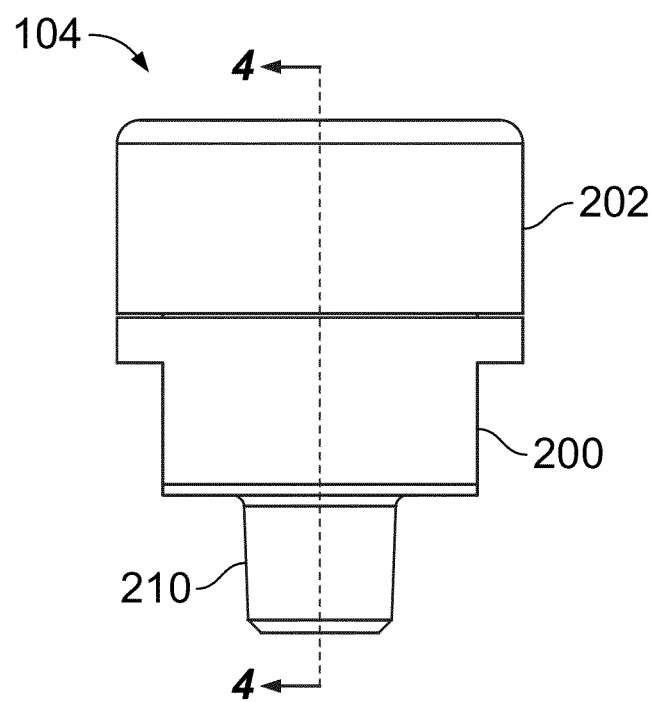
FIG. 3 illustrates a side elevation view of the gas control valve shown in FIG. 2, in accordance with an example implementation.
Figure 4:
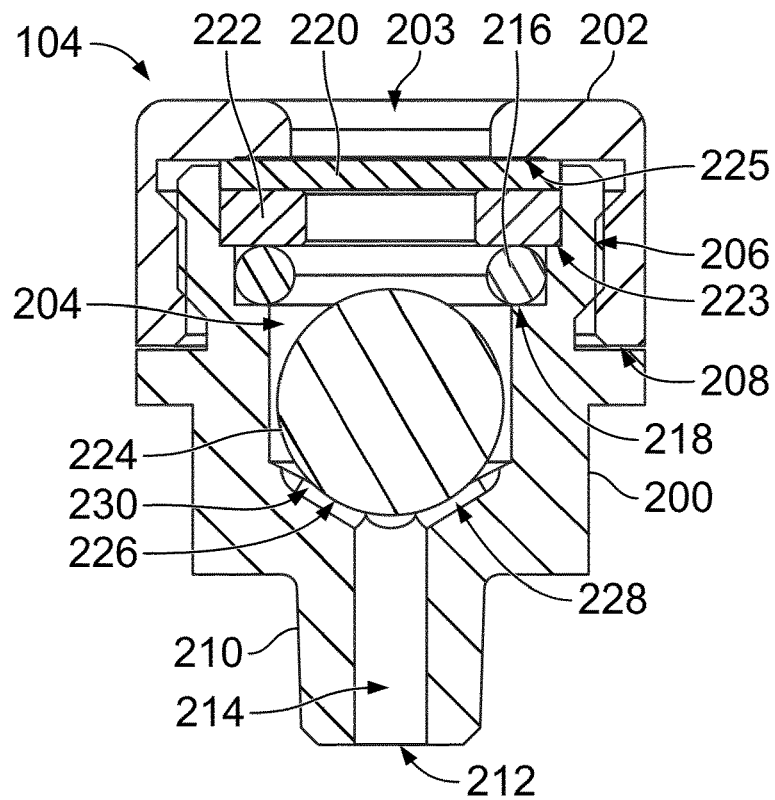
FIG. 4 illustrates a side cross-sectional view labelled in FIG. 3, in accordance with an example implementation.
Figure 5:
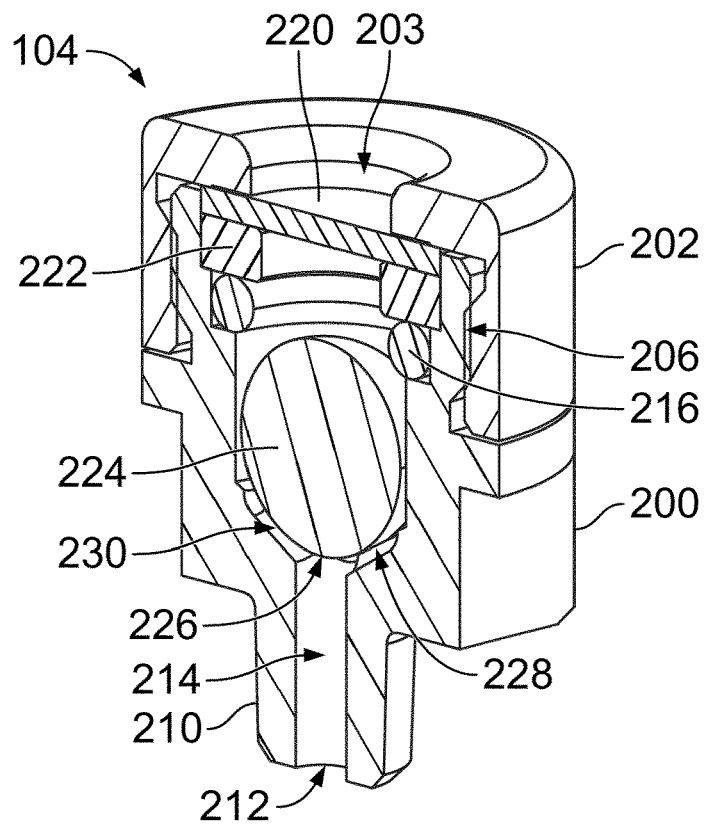
FIG. 5 illustrates a perspective view of the side cross-sectional view of FIG. 4, in accordance with an example implementation.

FIG. 2 illustrates a perspective view of the gas control valve 104, FIG. 3 illustrates a side elevation view of the gas control valve 104, and FIG. 4 illustrates a side cross-sectional view labelled in FIG. 3, and FIG. 5 illustrates a perspective view of the side cross-sectional view of FIG. 4, in accordance with an example implementation. The gas control valve 104 includes a housing having a two-piece construction comprising a valve body 200 and a cap 202. The cap 202 has an opening 203 to allow gas to flow into and out of a valve chamber 204 defined or enclosed by the valve body 200 and the cap 202.

In an example, the cap 202 is mounted and coupled to the valve body 200 at threaded region 206. Particularly, the cap 202 can have internal threads formed in an interior surface thereof and the valve body 200 can have exterior threads formed on an exterior surface thereof and configured to engage the internal threads of the cap 202. As an example, for illustration, threads of the thread can include Acme or trapezoidal threads. Other techniques could be used to couple the cap 202 to the valve body 200. As examples, flanges with fasteners, interrupted threads, pin, set screws, etc. could be used to couple the cap 202 to the valve body 200.

In an example, the cap 202 can be placed on top of the valve body 200, then rotated to be screwed to the valve body 200 until an end of the cap 202 reaches and rests against a shoulder 208 formed by the exterior surface of the valve body 200. In another example, however, the cap might not contact the valve body 200 at the shoulder 208, such that there is a gap therebetween.

The valve body 200 includes a neck portion 210 that facilitates mounting the gas control valve 104 to the reservoir 106. As an example, the neck portion 210 can have threads (e.g., ¼ inch National Pipe Thread (NPT)) on its exterior surface configured to engage with internal threads formed in the reservoir 106 to couple the gas control valve 104 to the reservoir 106.

Other connections could be used, however. For example, the neck portion 210 can have a groove formed in its exterior surface and configured to receive an O-ring or retaining ring. The reservoir 106 can have a corresponding groove formed in its interior surface configured to receive the O-ring or retaining ring. The neck portion 210 is inserted into the reservoir 106 until the grooves are aligned, and the O-ring or retaining ring expands in the space formed by the aligned grooves. The O-ring or retaining ring thus retains the neck portion 210 within the reservoir 106.

Further, the neck portion 210 has a port 212 configured to be in fluid communication with the internal chamber of the reservoir 106 when the gas control valve 104 is coupled to the reservoir 106. The neck portion 210 also has a channel 214 that communicates or fluidly couples the port 212 to the valve chamber 204 to allow fluid communication between the valve chamber 204 and the internal chamber of the reservoir 106. The term "fluid" is used herein to mean liquid, gas, or a mixture of liquid and gas.

As shown in FIG. 4, the gas control valve 104 further includes a seal 216 (e.g., an O-ring radial seal) resting on a shoulder 218 formed by the interior surface of the valve body 200. The gas control valve 104 also includes a filter 220 that encloses the valve chamber 204. The gas control valve 104 further includes a washer or spacer 222 interposed between the seal 216 and the filter 220. The spacer 222 rests at a shoulder 223 formed by the interior surface of the valve body 200, and the spacer 222 interfaces with the seal 216. The filter 220 is interposed between the spacer 222 and a flanged portion 225 (e.g., a projecting flat rim, collar, or rib) of the cap 202.

The spacer 222 can be formed as an annulus (i.e., is ring-shaped) and to allow gas flow therethrough. The filter 220 is porous and is also configured to allow gas to flow therethrough while filtering other liquids and materials. As an example for illustration, the filter 220 can be made of sintered stainless steel material and may filter any particles that are larger than 40 micron in diameter. The filter 220 is configured to prevent debris from entering the valve chamber 204 or the reservoir 106.

In an example, the filter 220 also operates as a coalescing filter configured to separate liquid aerosols (e.g., configured to filter liquid droplets) from the gas flowing out of the valve chamber 204 to the external environment or flowing into the valve chamber 204 from the external environment. Specifically, the filter 220 can remove submicron liquid droplets from the gas flowing through it.

Further, in examples, the reservoir 106 is cleaned with a mild acid or detergent and then heated to sanitize it. In some cases, cleaning fluids might not be completely removed when cleaning is finished and fluid might remain coating some components of the gas control valve 104 and the reservoir 106. The filter 220 is thus configured to filter droplets of such fluid to prevent them from escaping to an external environment of the assembly 102.

As shown in FIG. 4, the gas control valve 104 includes a float ball 224 disposed within the valve chamber 204. As described in detail below, when the reservoir 106 is being filled initially and when the reservoir 106 is being drained, the float ball 224 is configured to be seated at a seat 226 formed by an interior surface of the valve body 200 about an end of the channel 214. For example, the seat 226 can be formed as a conical seat or other tapered seat shapes.

When seated, the float ball 224 can have a line contact with the seat 226 or contact at least three points about the seat 226. Further, the gas control valve 104, and particularly the valve body 200, has one or more flow directing features such as fluid flow groove 228 and fluid flow groove 230 formed about the seat 226 where the float ball 224 ball sits. Such flow directing features are configured to enable gas to flow around the float ball 224 when the float ball 224 is seated at the seat 226.

Figure 6:
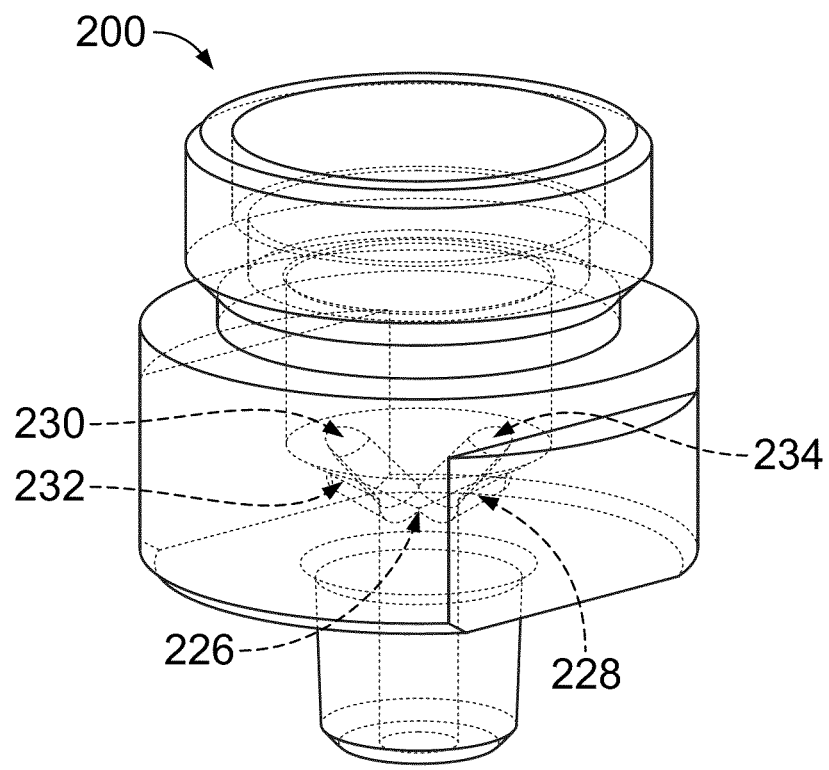
FIG. 6 illustrates a transparent view of a valve body of the gas control valve, in accordance with an example implementation.
Figure 7:
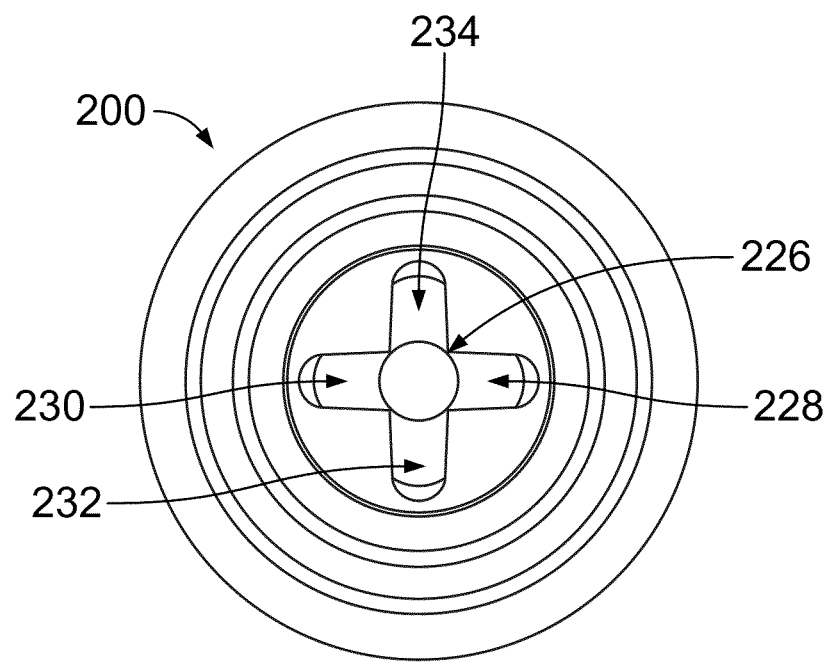
FIG. 7 illustrates a top view of the valve body, in accordance with an example implementation.

FIG. 6 illustrates a transparent view of the valve body 200, and FIG. 7 illustrates a top view of the valve body 200, in accordance with an example implementation. As shown in FIG. 6-7, in an example, the valve body 200 includes a plurality of fluid flow grooves formed in the valve body 200 about the seat 226. In the example implementation of FIGS. 6-7, the valve body 200 includes four fluid flow grooves: the fluid flow groove 228, the fluid flow groove 230, a fluid flow groove 232, and a fluid flow groove 234. As such, the fluid flow grooves 228-234 form a tee-shaped groove as seen in the top view of FIG. 7. In other example implementation, more or fewer fluid flow grooves could be used.

In the example implementation of FIGS. 6-7, the fluid flow grooves 228-234 emanate radially from a center region of the seat 226. Particularly, the fluid flow grooves 228-234 are disposed in an array about the center of the seat 226. The fluid flow grooves can take other forms or shapes. As an example, rather than using grooves emanating radially from a center region, one or more spiral grooves can be formed in the seat 226 to perform the same operations of the fluid flow grooves 228-234 (see FIG. 14).

As such, the gas control valve 104 comprises what can generally be referred to as "flow directing features" that are configured to enable gas to flow around the float ball 224 when the float ball 224 is seated at the seat 226. An example of such flow directing features is one or more fluid flow grooves such as the fluid flow grooves 228-234. Another example includes other types of grooves such as the plurality of spiral grooves shown in FIG. 14. In another example, rather than using grooves, holes or fluid passages can be formed (e.g., drilled) in the valve body 200 about the seat 226 to direct fluid flow from the channel 214 to the valve chamber 204 around the float ball 224 As described next, such flow directing features enable the float ball 224 to remain seated until liquid rises within the reservoir 106.

During filling the reservoir 106, the source 108 provides the reservoir 106 with liquid via the fluid line 110. As the reservoir 106 is being filled, the gas (e.g., air) therein is displaced toward the gas control valve 104.

Figure 8:
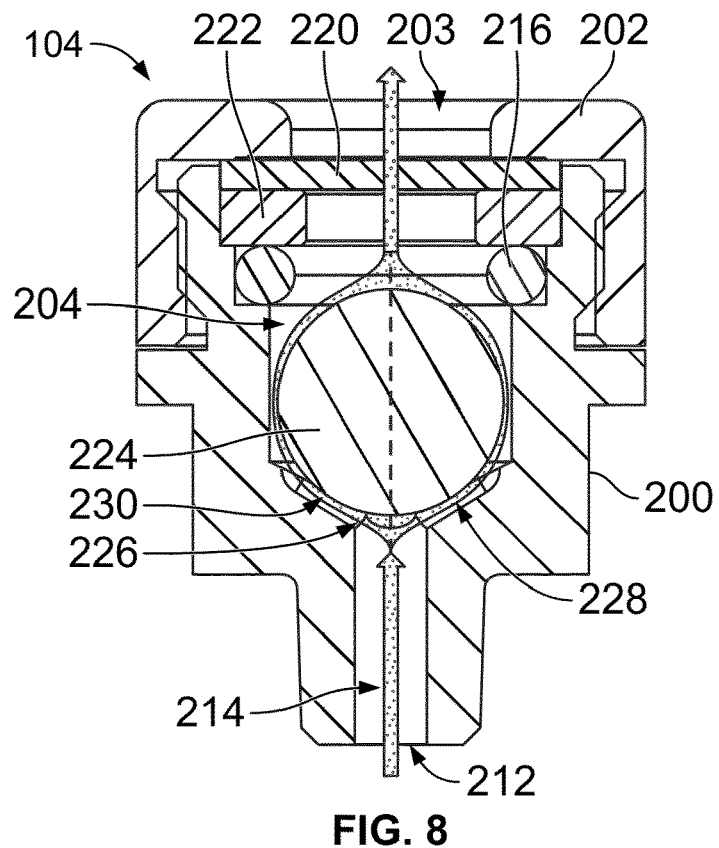
FIG. 8 illustrates the side cross-sectional view of FIG. 2 showing gas flow during filling a reservoir with liquid, in accordance with an example implementation.

FIG. 8 illustrates the side cross-sectional view of FIG. 2 showing gas flow during filling the reservoir 106 with liquid, in accordance with an example implementation. Gas flow is shown in arrows. As depicted, gas flows through the fluid flow grooves 228-234 around the float ball 224, through the valve chamber 204, the spacer 222, the filter 220, and through the opening 203 of the cap 202 to the external environment of the gas control valve 104.

The gas flow areas between the float ball 224 and the seat 226, i.e., the flow areas through the fluid flow grooves 228-234, operate as restrictions or narrowed flow zones, causing fluid to be accelerated through such restriction and pressure level at the fluid flow grooves 228-234 to be decreased relative to surrounding areas.

As a result of pressure level in the valve chamber 204 above the float ball 224 being higher than pressure level in the fluid flow grooves 228-234 underneath the float ball 224, the float ball 224 is forced toward the seat 226. Thus, the float ball 224 remains seated at the seat 226 as the reservoir 106 is being filled, and gas flows from the valve chamber 204 to the external environment of the gas control valve 104.

The float ball 224 is configured to remain seated until liquid reaches the gas control valve 104, enters through the port 212, the channel 214, and the fluid flow grooves 228-234 to the valve chamber 204, and reaches a particular level within the valve chamber 204. In an example, the float ball 224 is made of a material having a density that is less that the density of the liquid. For example, the float ball 224 can be made of polypropylene. As an example for illustration, the float ball 224 can be made to have a density that is 0.9 the density of the liquid filling the reservoir 106. As such, the float ball 224 does not float immediately as fluid enters the valve chamber 204. Rather, the float ball 224 may remain seated at the seat 226 until the liquid covers about 90% of the volume of the float ball 224 (i.e., when the float ball 224 is 90% submerged in liquid), and then the float ball 224 starts to float on the liquid.

Figure 9:
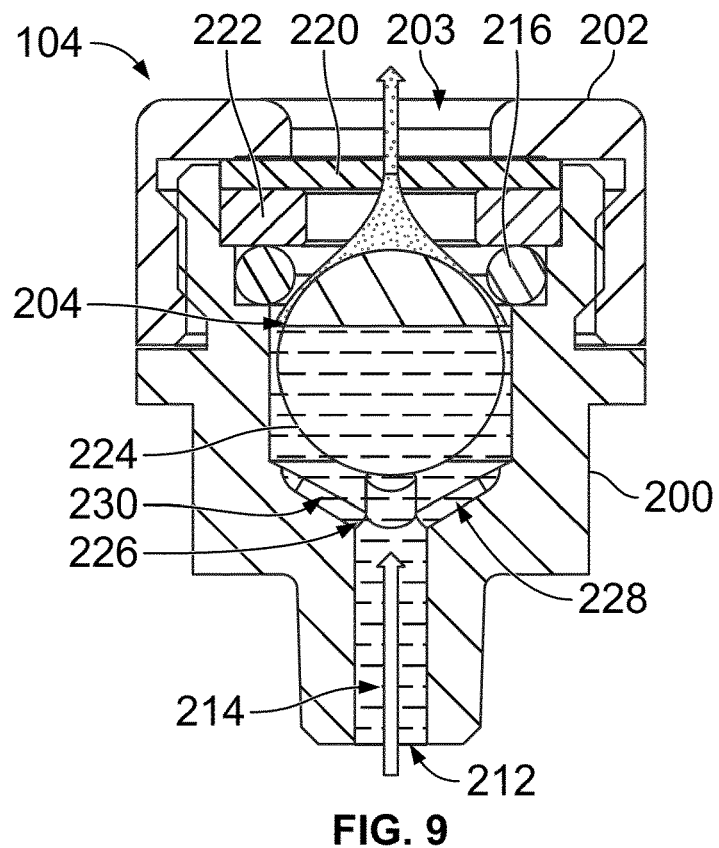
FIG. 9 illustrates the side cross-sectional view of FIG. 2 showing a float ball floating in an intermediate state, in accordance with an example implementation.

FIG. 9 illustrates the side cross-sectional view of FIG. 2 showing the float ball 224 floating in an intermediate state, in accordance with an example implementation. Particularly, the float ball 224 is shown in a state where it lifted off the seat 226 and is floating above the liquid, but has not yet reached the seal 216. In this state, as liquid is filling the valve chamber 204, gas keeps flowing out of the valve chamber 204 to the external environment as depicted with arrows in FIG. 9. The float ball 224 can move upward as liquid keeps filling the valve chamber 204 until the float ball 224 reaches the seal 216.

Figure 10:
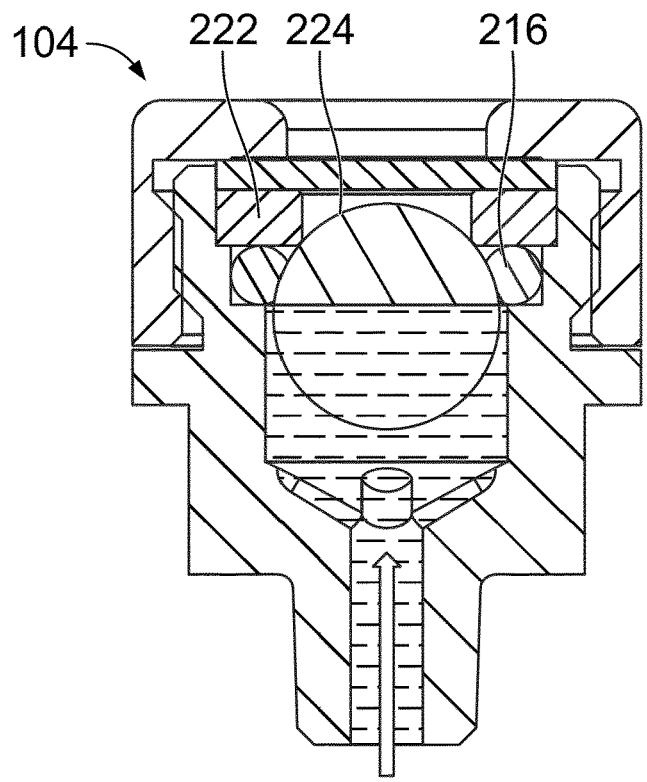
FIG. 10 illustrates the side cross-sectional view of FIG. 2 showing a float ball contacting a seal and sealing a valve chamber, in accordance with an example implementation.

FIG. 10 illustrates the side cross-sectional view of FIG. 2 showing the float ball 224 contacting the seal 216 and sealing the valve chamber 204, in accordance with an example implementation. As shown, the float ball 224 floats until it contacts the seal 216. The float ball 224 may also contact inner edges of the spacer 222 as shown.

The seal 216 is made of a soft material (e.g., a Viton® O-ring). As such, as the float ball 224, which is solid and relatively harder than the seal 216, reaches the seal 216, the seal 216 deforms and conforms to the microstructure of the float ball 224 interacting therewith. Thus, the float ball 224 and the seal 216 form a bond at their contact area, thereby sealing the liquid within the valve chamber 204.

As such, the reservoir 106 is filled and gas is released or displaced from the reservoir 106. The gas control valve 104 allows the filling of the reservoir 106 and the release of the gas passively, i.e., without having to provide electrical commanded to an electrically actuated valve, for example.

Once the float ball 224 seals the valve chamber 204, the source 108 (e.g., the pump) is "deadheaded," meaning that providing more liquid to the reservoir 106 causes pressure level within the reservoir 106 to increase because no more gas or fluid can escape from the valve chamber 204. When pressure level reaches a threshold value, the source 108 is triggered or commanded to stop providing liquid to the reservoir 106, for example.

During the filling operation, the fluid flow grooves 228-234 may offer several advantages. As mentioned above, they operate as restrictions creating a pressure imbalance about the float ball 224 that keeps the float ball 224 seated until the float ball 224 is substantially submerged. Further, the source 108 can be a pump driven by an electric motor. When the electric motor is given an initial command to drive the pump to begin providing liquid to the reservoir 106, an initial spike in liquid flow may occur. Such initial spike may occur as the initial electric current to the electric motor produces a spike in the torque provided by the electric motor to the pump.

Such spike in liquid flow to the reservoir 106 may cause a corresponding surge in displaced gas toward the float ball 224. Without the fluid flow grooves 228-234, the float ball 224 may shoot up at a high acceleration toward the seal 216. Such sudden, high acceleration motion may cause the float ball 224 to be stuck to the seal 216 and prematurely preclude flow of gas out of the reservoir 106. In other words, the float ball 224 would seal the valve chamber 204 prematurely prior to filling the reservoir 106 and displacing the gas therein.

The fluid flow grooves 228-234 may preclude such scenario. Particularly, gas might not flow directly into the float ball 224. Rather, gas is allowed to flow, or is routed through, the fluid flow grooves 228-234 around the float ball 224 while keeping the float ball 224 seated at the seat 226. Thus, as described above, the float ball 224 remains seated and gas is allowed to keep flowing out of the valve chamber 204 until liquid submerges a substantial volume of the float ball 224.

The spacer 222 also may advantageously preclude damaging the gas control valve 104 under pressure spikes. During a filling operation, a pressure spike (e.g., up to 1000 pounds per square inch) may occur in liquid pressure level. Such pressure spike may launch the float ball 224 at high speeds toward the seal 216. The spacer 222 may ensure that the float ball 224 remain in the valve chamber 204 and preclude the float ball 224 from being forced through the seal 216 and trapped on the other side of the seal 216. Without the spacer 222, the float ball 224 may be wedged, stuck, or trapped on the other side of the seal 216 and may damage the filter 220. During draining the reservoir 106, a vacuum might be generated in the valve chamber 204 as the float ball 224 is being stuck in such position. However, such vacuum might not be sufficient to release the float ball 224 from a wedged or stuck position.

Thus, the spacer 222 precludes the float ball 224 from moving beyond the seal 216 and forces the float ball 224 to remain within the valve chamber 204. As such, the spacer 222 operates as a hard stop for the float ball 224 that precludes the float ball 224 from moving upward beyond a particular plane or particular position within the valve chamber 204.

A spacer or washer is used herein as an example, and other types of hard stops could be used. For instance, a retaining ring could be used. In another example, the hard stop could be integrated in the valve body 200 provided there is enough space to allow the seal 216 to be inserted and placed in position. In another example, after the seal 216 is positioned, a screw can be screwed into the valve body 200, protruding inward to operate as a hard stop. In another example, one or more pins could be used rather than screws. In another example, a wire grate or mesh can be used.

The gas control valve 104 also facilitates filling the reservoir 106 with gas when it is desired to drain the reservoir 106. Particularly, the gas control valve 104 facilitates replacing the liquid being drawn from the reservoir 106 with gas or air to preclude creation of vacuum within the reservoir 106.

Figure 11:
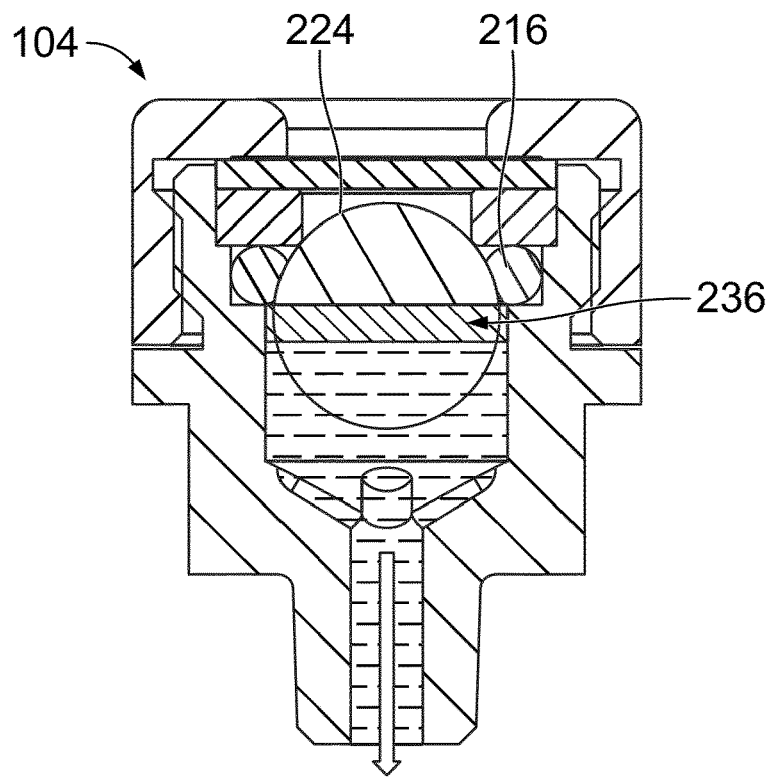
FIG. 11 illustrates the side cross-sectional view of FIG. 2 showing liquid receding within a valve chamber during draining of a reservoir, in accordance with an example implementation.

FIG. 11 illustrates the side cross-sectional view of FIG. 2 showing liquid receding within the valve chamber during draining of the reservoir 106, in accordance with an example implementation. As fluid is being drawn through the fluid line 112 (shown in FIG. 1), liquid level within the valve chamber 204 decreases. Because of the hysteresis caused by the physical interaction between the seal 216 and the floating ball 224, a partial vacuum may be generated in zone 236 above the liquid level as schematically depicted in FIG. 11. As a result, the force applied to the float ball 224 against the seal 216 decreases and the float ball 224 is released from the seal 216. The float ball 224 can then float over the liquid.

Figure 12:
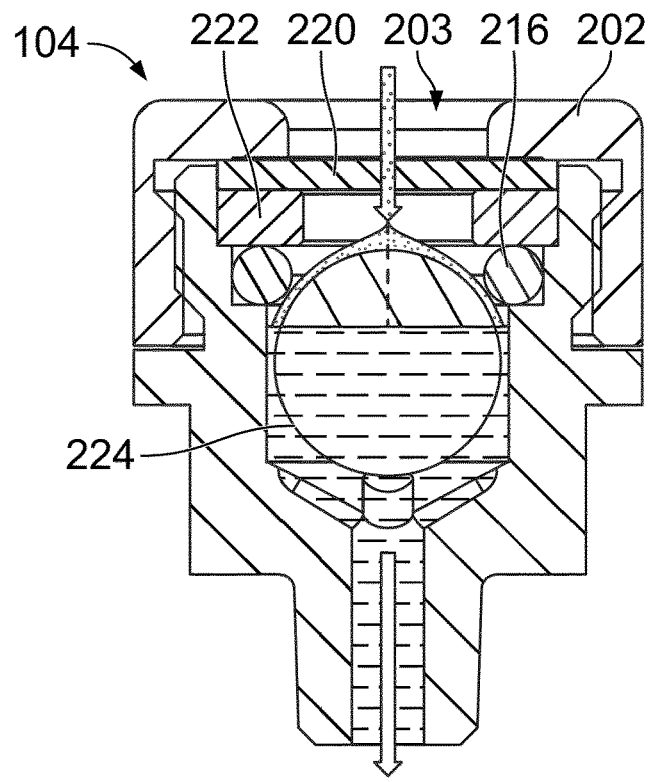
FIG. 12 illustrates the side cross-sectional view of FIG. 2 showing a float ball released from a seal and floating on liquid, in accordance with an example implementation.

FIG. 12 illustrates the side cross-sectional view of FIG. 2 showing the float ball 224 released from the seal 216 and floating on liquid, in accordance with an example implementation. As the liquid level decreases further and the float ball 224 moves downward with the level of liquid, gas is drawn from the external environment of the gas control valve 104 into the valve chamber 204 through the opening 203, the filter 220, and the spacer 222, which is ring-shaped as shown with an arrow in FIG. 12. The float ball 224 can keep moving down until it reaches the seat 226.

Figure 13:
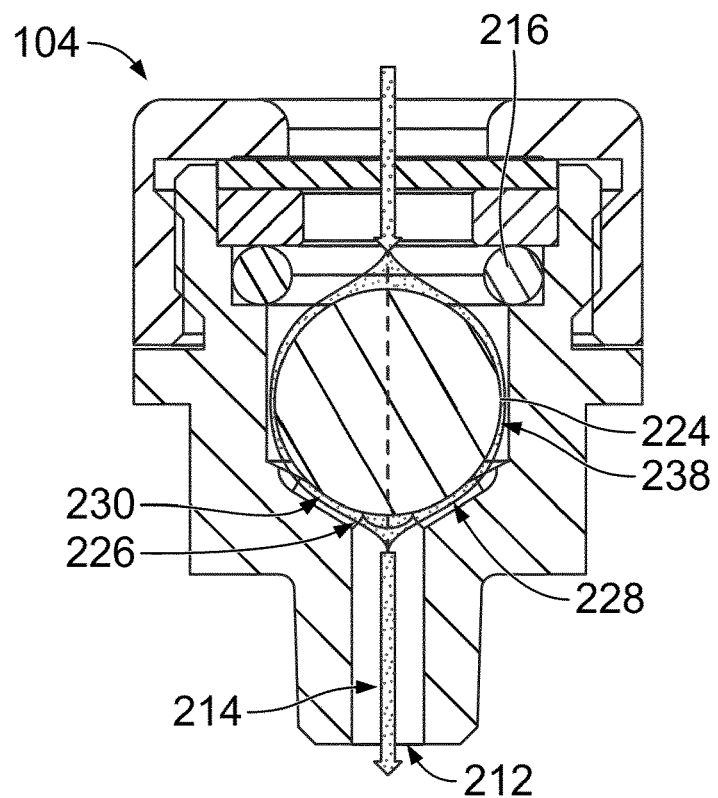
FIG. 13 illustrates the side cross-sectional view of FIG. 2 showing a float ball reaching a seat during draining liquid from a reservoir, in accordance with an example implementation.

FIG. 13 illustrates the side cross-sectional view of FIG. 2 showing the float ball 224 reaching the seat 226 during draining liquid from the reservoir 106, in accordance with an example implementation. Any remaining liquid in the valve chamber 204 above the float ball 224 or any liquid clinging to the float ball 224 is not trapped in the valve chamber 204, but is rather allowed to flow through the fluid flow grooves 228-234, then through the channel 214 and the port 212 to the reservoir 106 to be drained.

Further, gas continues to be withdrawn from the external environment of the gas control valve as depicted by the arrows in FIG. 13. If the float ball 224 blocks gas flow when seated, vacuum would be generated in the reservoir 106 as liquid level decreases therein. However, with the configuration of the gas control valve 104, the fluid flow grooves 228-234 allow gas to flow around the float ball 224 into the channel 214, then through the port 212 to the reservoir 106 and keep filling the reservoir 106 as liquid is drained. This way, vacuum or cavitation might not occur within the reservoir 106 as it is being drained.

Further, narrow cross section flow area 238 around the float ball 224 (i.e., between the float ball 224 and the interior surface of the valve body 200 bounding the valve chamber 204) as well as the fluid flow grooves 228-234 operate as restrictions, causing fluid to accelerate therethrough. As a result of the increase in fluid velocity and the decrease in pressure level in such restrictions, gas removes fluid stuck to the float ball 224 and cleans the float ball 224. In an example, the increased gas velocity through the restrictions imparts momentum to the fluid, causing the fluid to flow into the reservoir 106 as a multi-phase fluid (i.e., liquid-gas mixture).

In an example, the seat 226 and the float ball 224 can be configured such that the float ball 224 spins around its axes to allow the gas to clean substantially all surfaces of the float ball 224. For example, the float ball 224 can be mounted within the valve body 200 in a manner that allows for asymmetric flow velocity profile of gas flowing between the float ball 224 and the interior surface of the valve body 200. Particularly, if gas is flowing at a higher speed on one side of the float ball 224 compared to gas flowing on the opposite side of the float ball 224, such asymmetric velocity profile could cause the float ball 224 to spin.

In another example, some of the fluid flow grooves 228-234 could be made to have a different depth compared to other fluid flow grooves, thereby generating an asymmetric gas velocity profile about the float ball 224. In another example, several holes can be formed in the valve body 200 about the seat 226 and the holes can have different diameters or sizes. The holes can be used to direct flow from the channel 214 to the valve chamber 204. Such configuration amounts to having an air bearing effect about the float ball 224 that can cause the float ball 224 to lift off. Because the holes have different sizes, gas velocities through the holes around the float ball 224 may differ, thereby causing the float ball 224 to spin. In yet another example, the above-referenced example flow directing features comprising spiral grooves (see FIG. 14) could cause the float ball 224 to spin.

As mentioned above, in some examples, the gas control valve 104 can be used in medical applications such dialysis machines. In these examples, the components of the gas control valve 104 are made of biocompatible materials. For example, the valve body 200, the cap 202, the filter 220, and the spacer 222 can be made of stainless steel. As an example for illustration, stainless steel grade 316 could be used. Grade 316 stainless steel is a molybdenum-bearing grade and has enhanced resistance to pitting and crevice corrosion in chloride environments. Grade 316 stainless steel also can withstand high temperatures.

In other examples, polyvinylidene fluoride (PVDF) polymer material can be used. PVDF has enhanced chemical resistance to a wide range of aggressive chemicals. PVDF can also withstand high temperatures. Further, the seal 216 can be made of Viton®, which is a synthetic rubber and fluoropolymer elastomer that is chemically-resistant.

Several configuration variations can be implemented to the example implementation of the gas control valve 104 depicted in FIGS. 2-7. For example, different flow directing features (e.g., different fluid flow groove configuration) can be used.

Figure 14:
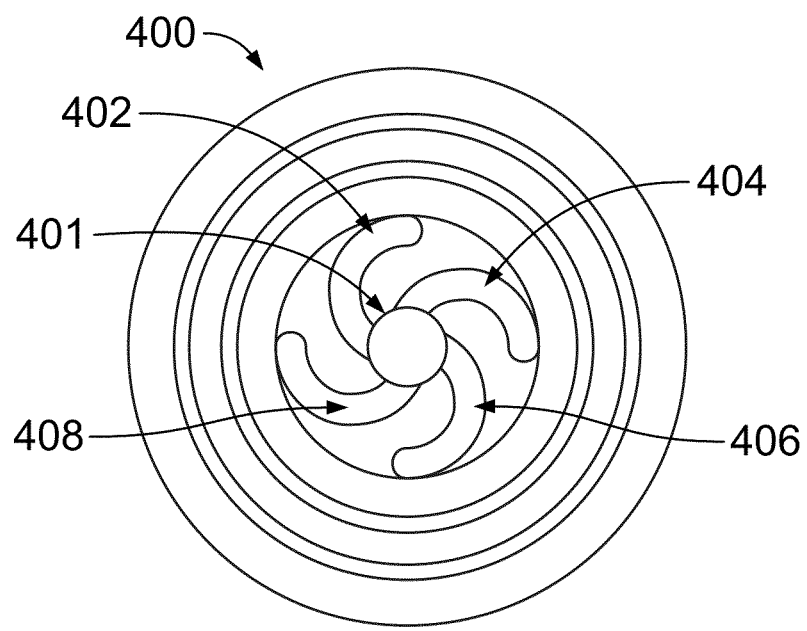
FIG. 14 illustrates a top view of a valve body having spiral grooves, in accordance with an example implementation.

FIG. 14 illustrates a top view of a valve body 400 having spiral grooves, in accordance with an example implementation. The valve body 400 can be used instead of the valve body 200, for example. The valve body 400 includes flow directing features comprising spiral grooves. The term "spiral groove" is used herein to indicate a groove having a curved shape and emanating from a point (i.e., the center region of a seat 401 in the valve body 400), wherein the groove moves farther away as it revolves around the point.

Particularly, as shown, the valve body 400 includes spiral groove 402, spiral groove 404, spiral groove 406, and spiral groove 408 formed about the seat 401 (similar to the seat 226) in the valve body 400. The spiral grooves 402-408 can perform the same operations of the fluid flow grooves 228-234 described above. Additionally, the configuration of the spiral grooves 402-408 may cause the float ball 224 to spin about its own axes to allow the gas to clean substantially all surfaces of the float ball 224. Although four spiral grooves are shown in FIG. 14, in other example implementation, more of fewer spiral grooves could be used.

Other variations can be implemented based on the application. For example, in some applications, high temperatures within the gas control valve 104 (e.g., when disinfecting the gas control valve 104 with high temperature fluid or gas in a medical application) can cause fluid (e.g., water) condensation. Condensed fluid can flow on the interior surface of the valve body 200 and fill the fluid flow grooves 228-234 (or the spiral grooves 402-408) and can also block the narrow cross section flow area 238 (shown in FIG. 13). In this case, gas flowing from the reservoir 106 through the channel 214 might not have a path to flow around the float ball 224, and thus may cause the float ball 224 to lift off the seat 226 and move toward the seal 216, potentially prematurely sealing the valve chamber 204. It may thus be desirable in some applications to increase the inner diameter of the valve body around the float ball 224 to preclude fluid condensation from blocking gas flow.

Figure 15:
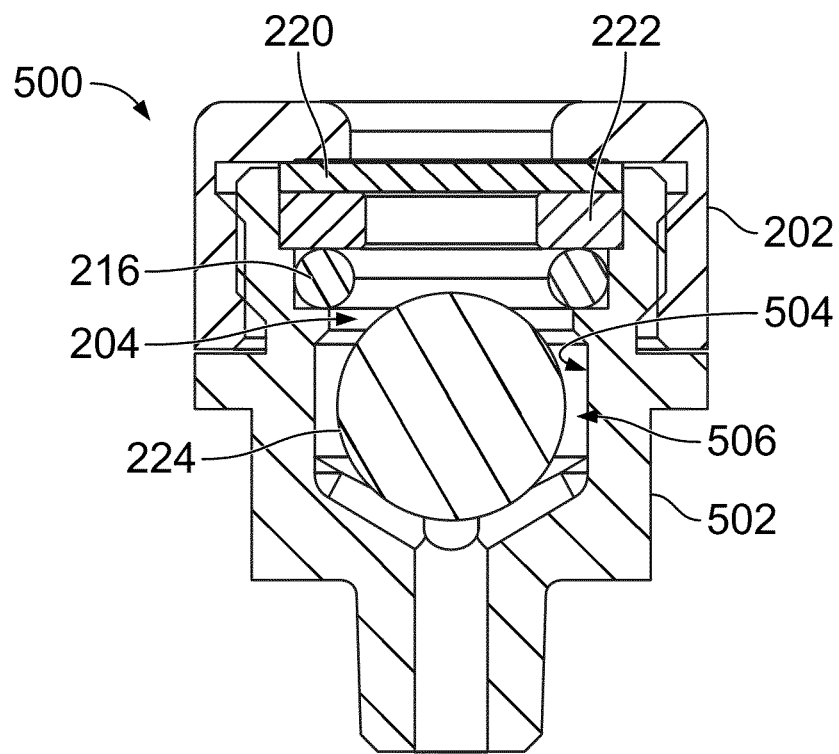
FIG. 15 illustrates a cross-sectional view of a gas control valve having a valve body with an increased inner diameter, in accordance with an example implementation.

FIG. 15 illustrates a cross-sectional view of a gas control valve 500 having valve body 502 with an increased inner diameter, in accordance with an example implementation. As shown, the gas control valve 500 is similar to the gas control valve 104 and the valve body 502 is similar to the valve body 200. However, the valve body 502 has a recessed area or undercut 504 formed in the interior surface of the valve body 502 surrounding the float ball 224. As such, flow area 506 formed between the float ball 224 and the interior surface of the valve body 502 is larger than the narrow cross section flow area 238 shown in FIG. 13.

Such increase flow area causes the velocity of gas to be reduced during a filling operation, thereby reducing the net force pushing the float ball 224. Also, condensed fluids might not block the flow area 506 around the float ball 224 due to the larger size of the flow area 506, and thus gas can continue to flow through the flow area 506 rather than causing the float ball 224 to prematurely seal off the valve chamber 204.

Further, in example implementations, the fluid flow grooves 228-234 (or the spiral grooves 402-408) can be made deeper. Such deeper grooves might preclude the grooves from being blocked by condensed fluids.

Figure 16:
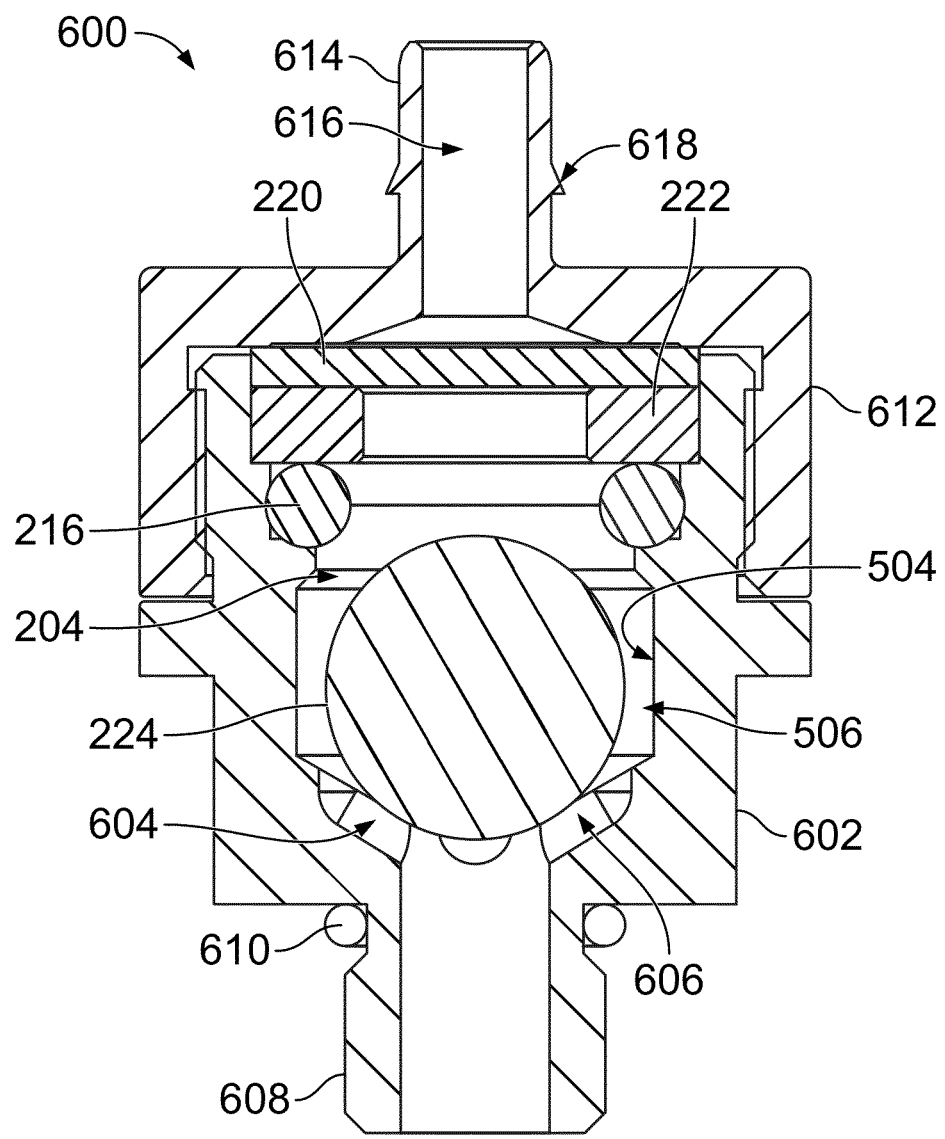
FIG. 16 illustrates a cross-sectional view of a gas control valve having deeper fluid flow grooves, in accordance with an example implementation.

FIG. 16 illustrates a cross-sectional view of a gas control valve 600 having deeper fluid flow grooves, in accordance with an example implementation. The gas control valve 600 is similar to the gas control valves 104, 500. However, the gas control valve 600 has a valve body 602 with deeper fluid flow grooves such as fluid flow groove 604 and fluid flow groove 606.

Compared to the fluid flow grooves 228-234 of the gas control valve 104, the fluid flow grooves 604, 606 are deeper and provide a larger flow area. With this configuration, any condensed fluid can be drained readily through the fluid flow grooves 604, 606. Thus, condensed fluids might not block the fluid flow grooves 604, 606, and gas can continue to flow through the fluid flow grooves 604, 606 rather than causing the float ball 224 to lift off and prematurely seal the valve chamber 204.

The gas control valve 600 shows other variations compared to the gas control valves 104, 500. For example, the valve body 200 and the valve body 502 have tapered NPT type threads. In other applications, a different type of threaded connection may be desired. For instance, straight threads used in Society of Automotive Engineers (SAE) threads may be desired.

Particularly, the valve body 602 has a neck portion 608, which can have straight threads per SAE standards. The gas control valve 600 can further include a seal 610 disposed about the neck portion 608 to be suitable for SAE type fittings.

Further, the cap 202 shown and described with respect to the gas control valves 104, 500 allows gas to be vented directly to an external environment (e.g., atmosphere) of the gas control valves 104, 500. In other examples, it may be desirable to couple the gas control valve to a fluid line (e.g., tube, hose, or pipe) rather than venting gas to the atmosphere.

The gas control valve 600 has a cap 612 having a connection portion 614, which has a channel 616 formed therethrough. The connection portion 614 can be configured to have tapered threads, straight threads, barbs, etc. to mate with different types of fittings. As a particular example for illustration, the connection portion 614 can have a barb 618 that facilities connecting the gas control valve 600 to a fluid line. This way, gas is exhausted to such fluid line via the channel 616.

Figure 17:
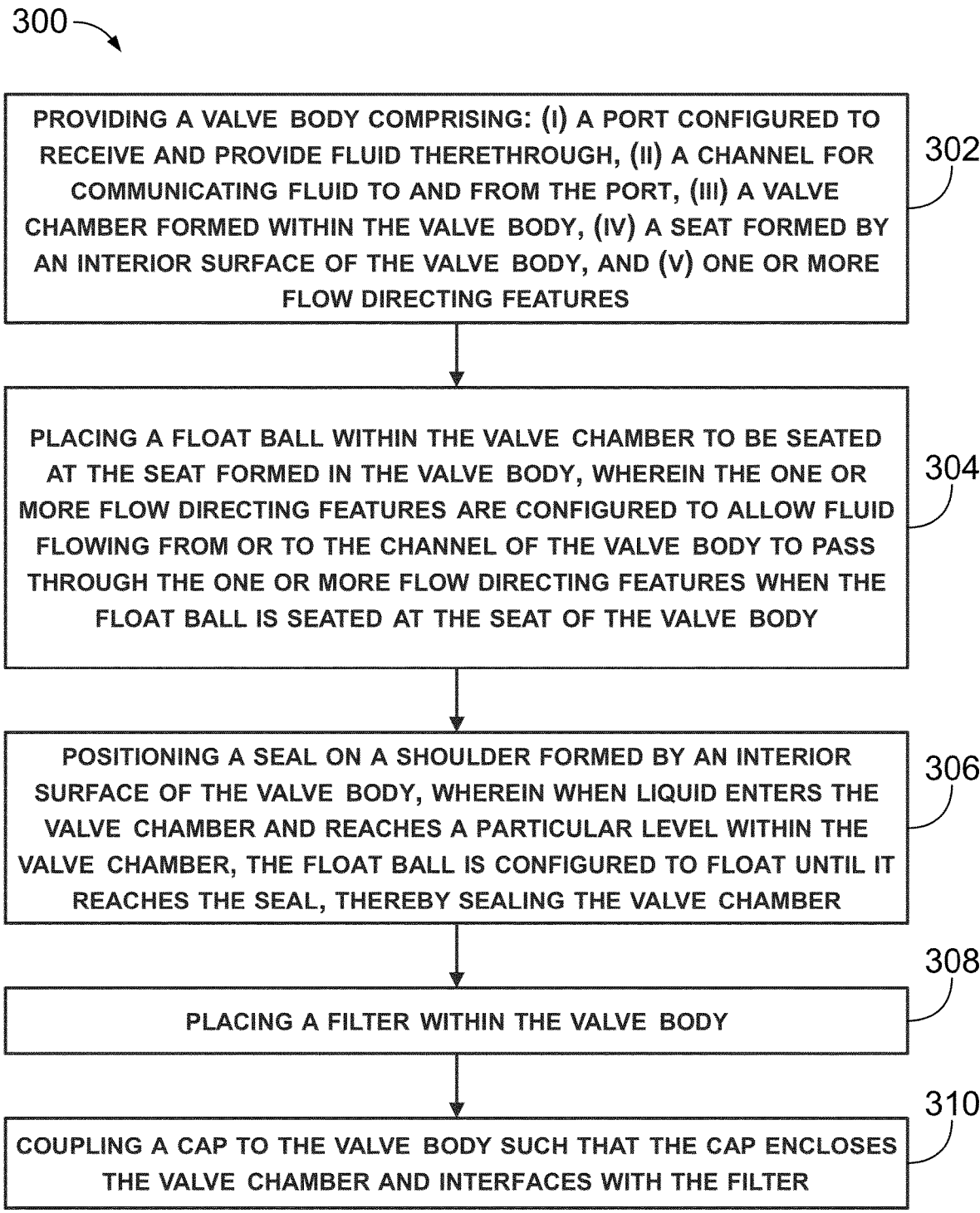
FIG. 17 is a flowchart of a method for assembling a valve, in accordance with an example implementation.

FIG. 17 is a flowchart of a method 300 for assembling a valve, in accordance with an example implementation. The method 300 shown in FIG. 17 presents an example of a method that can be used to assemble the gas control valves 104, 500, 600 for example, and may also involve assembling the gas control valve 104, 500, 600 to the reservoir 106. The method 300 may include one or more operations, functions, or actions as illustrated by one or more of blocks 302-310.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 302, the method 300 includes providing a valve body comprising: (i) a port configured to receive and provide fluid therethrough, (ii) a channel for communicating fluid to and from the port, (iii) a valve chamber formed within the valve body, (iv) a seat formed by an interior surface of the valve body, and (v) one or more flow directing features. The term "providing" as used herein, and for example with regard to the valve body 200 or other components, includes any action to make the valve body 200 or any other component available for use, such as bringing the valve body 200 to an apparatus or to a work environment for further processing (e.g., mounting other components, etc.).

At block 304, the method 300 includes placing a float ball within the valve chamber to be seated at the seat formed in the valve body, wherein the one or more flow directing features are configured to allow fluid flowing from or to the channel of the valve body to pass through the one or more flow directing features when the float ball is seated at the seat of the valve body.

At block 306, the method 300 includes positioning a seal on a shoulder formed by an interior surface of the valve body, wherein when liquid enters the valve chamber and reaches a particular level within the valve chamber, the float ball is configured to float until it reaches the seal, thereby sealing the valve chamber.

At block 308, the method 300 placing a filter within the valve body.

At block 310, the method 300 includes coupling a cap to the valve body such that the cap encloses the valve chamber and interfaces with the filter. For example, the cap 202 can be positioned on top of the valve body 200 and then rotated such that internal threads of the cap 202 engage with external threads of the valve body 200 at the threaded region

206. The cap 202 can be threaded until its end contacts or interfaces with the shoulder 208 of the valve body 200, for example.

The method 300 can include other steps as well. For instance, the method 300 can further include forming a hard stop within the valve chamber 204. As an example, method 300 includes positioning the spacer 222 within the valve body 200 such that the spacer 222 interfaces with the seal 216. For example, as mentioned above, the valve body 200 can have the shoulder 223, and the spacer 222 can be positioned on the shoulder 223, interfacing with the seal 216. The filter 220 can then be placed on the spacer 222 such that the spacer 222 is interposed between the seal 216 and the filter 220. The method 300 can further include coupling the gas control valve 104 to the reservoir 106.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Implementations of the present disclosure can thus relate to one of the enumerated example implementation (EEEs) listed below.

EEE 1 is a gas control valve comprising: a valve body comprising (i) a port configured to receive and provide fluid therethrough, (ii) a valve chamber, (iii) a seat formed by an interior surface of the valve body, and (iv) one or more flow directing features; a float ball disposed within the valve chamber, wherein the flow directing features are configured to allow fluid flowing from or to the port to pass through the flow directing features when the float ball is seated at the seat; a seal disposed within the valve body, wherein when liquid enters the valve chamber and reaches a particular level within the valve chamber, the float ball is configured to float on the liquid until it reaches the seal, thereby sealing the valve chamber; and a cap coupled to the valve body such that the cap encloses the valve chamber, wherein the cap comprises an opening configured to allow gas to flow therethrough into and out of the valve chamber.

EEE 2 is the gas control valve of EEE 1, wherein the valve body further comprises a channel that fluidly couples the port to the valve chamber.

EEE 3 is the gas control valve of any of EEEs 1-2, further comprising: a filter disposed within the valve body, wherein the cap interfaces with the filter.

EEE 4 is the gas control valve of any of EEEs 1-3, further comprising: a hard stop disposed within the valve chamber and configured to prevent the float ball from moving beyond a particular position within the valve chamber.

EEE 5 is the gas control valve of EEE 4, wherein the hard stop comprises a spacer interfacing with the seal.

EEE 6 is the gas control valve of EEE 5, further comprising: a filter disposed within the valve body, wherein the cap interfaces with the filter, and wherein the spacer is interposed between the seal and the filter.

EEE 7 is the gas control valve of any of EEEs 5-6, wherein the seal rests against a first shoulder formed by an interior surface of valve body, and wherein the spacer rests against a second shoulder formed by the interior surface of the valve body.

EEE 8 is the gas control valve of any of EEEs 1-7, wherein the one or more flow directing features comprise a plurality of spiral grooves formed about the seat.

EEE 9 is the gas control valve of any of EEEs 1-8, wherein the flow directing features comprise a plurality of fluid flow grooves emanating radially from a center of the seat and are disposed in an array about the center of the seat.

EEE 10 is a system comprising: a source of liquid; and an assembly comprising: a reservoir fluidly coupled to the source of liquid, and a gas control valve coupled to the reservoir, wherein the gas control valve is configured to allow gas to be released from the reservoir as the reservoir is being filled with liquid from the source of liquid, and allow gas to fill the reservoir as liquid is being drained from the reservoir, wherein the gas control valve comprises: a valve body comprising (i) a neck portion coupling the gas control valve to the reservoir, wherein the neck portion comprises a port configured to receive fluid from and provide fluid to the reservoir, (ii) a valve chamber, (iii) a seat formed by an interior surface of the valve body, and (iv) one or more flow directing features, a float ball disposed within the valve chamber, wherein the one or more flow directing features are configured to allow fluid flowing from or to the port to pass through the one or more flow directing features when the float ball is seated at the seat, a seal disposed within the valve body, wherein when liquid enters the valve chamber and reaches a particular level within the valve chamber, the float ball is configured to float on the liquid until it reaches the seal, thereby sealing the valve chamber, and a cap coupled to the valve body such that the cap encloses the valve chamber, wherein the cap comprises an opening configured to allow gas to flow therethrough into the valve chamber from an external environment of the gas control valve or allow gas to flow out of the valve chamber to the external environment.

EEE 11 is the system of EEE 10, wherein the gas control valve further comprises: a filter disposed within the valve body, wherein the cap interfaces with the filter, and wherein the filter is configured to filter liquid droplets and debris from gas flowing out of the valve chamber to the external environment or from the external environment to the valve chamber.

EEE 12 is the system of any of EEEs 10-11, wherein the gas control valve further comprises: a hard stop disposed within the valve chamber and configured to prevent the float ball from moving beyond a particular position within the valve chamber.

EEE 13 is the system of EEE 12, wherein the hard stop comprises a spacer interfacing with the seal, and wherein the gas control valve further comprises: a filter disposed within the valve body, wherein the cap interfaces with the filter, and wherein the spacer is interposed between the seal and the filter.

EEE 14 is the system of EEE 13, wherein the seal rests against a first shoulder formed by an interior surface of valve body, and wherein the spacer rests against a second shoulder formed by the interior surface of the valve body.

EEE 15 is the system of any of EEEs 10-14, wherein the valve body comprises an undercut formed in the interior surface of the valve body surrounding the float ball to increase flow area around the float ball.

EEE 16 is the system of any of EEEs 10-15, wherein the one or more flow directing features comprise (i) a plurality of fluid flow grooves emanating radially from a center of the seat and are disposed in an array about the center of the seat, or (ii) a plurality of spiral grooves formed about the seat.

EEE 17 is the system of any of EEEs 10-16, further comprising: a tank that is fluidly coupled to the reservoir and configured to receive fluid from the reservoir as liquid is being drained from the reservoir.

EEE 18 is a method comprising: providing a valve body comprising: (i) a port configured to receive and provide fluid therethrough, (ii) a channel for communicating fluid to and from the port, (iii) a valve chamber formed within the valve body, (iv) a seat formed by an interior surface of the valve body, and (v) one or more flow directing features; placing a float ball within the valve chamber to be seated at the seat formed in the valve body, wherein the one or more flow directing features are configured to allow fluid flowing from or to the channel of the valve body to pass through the one or more flow directing features when the float ball is seated at the seat of the valve body; positioning a seal on a shoulder formed by an interior surface of the valve body, wherein when liquid enters the valve chamber and reaches a particular level within the valve chamber, the float ball is configured to float until it reaches the seal, thereby sealing the valve chamber; placing a filter within the valve body; and coupling a cap to the valve body such that the cap encloses the valve chamber and interfaces with the filter EEE 19 is the method of EEE 18, further comprising: forming a hard stop within the valve chamber, wherein the hard stop is configured to prevent the float ball from moving beyond a particular position within the valve chamber.

EEE 20 is the method of EEE 19, wherein forming the hard stop comprises: positioning a spacer within the valve body such that the spacer interfaces with the seal and is interposed between the seal and the filter.

What is claimed is:

1. A gas control valve comprising:
   a valve body comprising (i) a port configured to receive and provide fluid therethrough, (ii) a valve chamber, (iii) a seat formed by an interior surface of the valve body, and (iv) one or more flow directing features comprising a plurality of spiral grooves formed about the seat;
   a float ball disposed within the valve chamber, wherein the one or more flow directing features formed about the seat are configured to allow fluid flowing from or to the port to pass through the one or more flow directing features when the float ball is seated at the seat;
   a seal disposed within the valve body, wherein when liquid enters the valve chamber and reaches a particular level within the valve chamber, the float ball is configured to float on the liquid until it reaches the seal, thereby sealing the valve chamber; and
   a cap coupled to the valve body such that the cap encloses the valve chamber, wherein the cap comprises an opening configured to allow gas to flow therethrough into and out of the valve chamber.

2. The gas control valve of claim 1, wherein the valve body further comprises a channel that fluidly couples the port to the valve chamber.

3. The gas control valve of claim 1, further comprising:
   a filter disposed within the valve body, wherein the cap interfaces with the filter.

4. The gas control valve of claim 1, further comprising:
   a hard stop disposed within the valve chamber and configured to prevent the float ball from moving beyond a particular position within the valve chamber.

5. The gas control valve of claim 4, wherein the hard stop comprises a spacer interfacing with the seal.

6. The gas control valve of claim 5, further comprising:
   a filter disposed within the valve body, wherein the cap interfaces with the filter, and wherein the spacer is interposed between the seal and the filter.

7. The gas control valve of claim 5, wherein the seal rests against a first shoulder formed by an interior surface of valve body, and wherein the spacer rests against a second shoulder formed by the interior surface of the valve body.

8. A system comprising:
   a source of liquid; and
   an assembly comprising: a reservoir fluidly coupled to the source of liquid, and a gas control valve coupled to the reservoir, wherein the gas control valve is configured to allow gas to be released from the reservoir as the reservoir is being filled with liquid from the source of liquid, and allow gas to fill the reservoir as liquid is being drained from the reservoir, wherein the gas control valve comprises:
   a valve body comprising (i) a neck portion coupling the gas control valve to the reservoir, wherein the neck portion comprises a port configured to receive fluid from and provide fluid to the reservoir, (ii) a valve chamber, (iii) a seat formed by an interior surface of the valve body, and (iv) one or more flow directing features formed about the seat, a float ball disposed within the valve chamber, wherein the one or more flow directing features formed about the seat are configured to allow fluid flowing from or to the port to pass through the one or more flow directing features when the float ball is seated at the seat, a seal disposed within the valve body, wherein when liquid enters the valve chamber and reaches a particular level within the valve chamber, the float ball is configured to float on the liquid until it reaches the seal, thereby sealing the valve chamber, a filter disposed within the valve body, a spacer interposed between the seal and the filter such that the spacer directly contacts the seal and the filter, and a cap coupled to the valve body such that the cap encloses the valve chamber, wherein the cap comprises an opening configured to allow gas to flow therethrough into the valve chamber from an external environment of the gas control valve or allow gas to flow out of the valve chamber to the external environment.

9. The system of claim 8,
wherein the cap interfaces with the filter, and wherein the filter is configured to filter liquid droplets and debris from gas flowing out of the valve chamber to the external environment or from the external environment to the valve chamber.

10. The system of claim 8, wherein the
the spacer is configured as a hard stop disposed within the valve chamber and configured to prevent the float ball from moving beyond a particular position within the valve chamber.

11. The system of claim 8, wherein the seal rests against a first shoulder formed by an interior surface of valve body, and wherein the spacer rests against a second shoulder formed by the interior surface of the valve body.

12. The system of claim 8, wherein the valve body comprises an undercut formed in the interior surface of the valve body surrounding the float ball to increase flow area around the float ball.

13. The system of claim 8, wherein the one or more flow directing features comprise (i) a plurality of fluid flow grooves emanating radially from a center of the seat and are disposed in an array about the center of the seat, or (ii) a plurality of spiral grooves formed about the seat.

14. The system of claim 8, further comprising:
a tank that is fluidly coupled to the reservoir and configured to receive fluid from the reservoir as liquid is being drained from the reservoir.

15. A method comprising:
providing a valve body comprising: (i) a port configured to receive and provide fluid therethrough, (ii) a channel for communicating fluid to and from the port, (iii) a valve chamber formed within the valve body, (iv) a seat formed by an interior surface of the valve body, and (v) one or more flow directing features formed about the seat;

placing a float ball within the valve chamber to be seated at the seat formed in the valve body, wherein the one or more flow directing features formed about the seat are configured to allow fluid flowing from or to the channel of the valve body to pass through the one or more flow directing features when the float ball is seated at the seat of the valve body, and wherein the valve body comprises a conical surface and a cylindrical surface, wherein the one or more flow directing features are formed in the conical surface, and wherein the cylindrical surface is configured as a recessed area in the interior surface of the valve body surrounding the float ball such that the valve body has an enlarged inner diameter around the float ball to increase flow area around the float ball;

positioning a seal on a shoulder formed by an interior surface of the valve body, wherein when liquid enters the valve chamber and reaches a particular level within the valve chamber, the float ball is configured to float until it reaches the seal, thereby sealing the valve chamber;

placing a filter within the valve body; and coupling a cap to the valve body such that the cap encloses the valve chamber and interfaces with the filter.

16. The method of claim 15, further comprising:
forming a hard stop within the valve chamber, wherein the hard stop is configured to prevent the float ball from moving beyond a particular position within the valve chamber.

17. The method of claim 16, wherein forming the hard stop comprises:
positioning a spacer within the valve body such that the spacer interfaces with the seal and is interposed between the seal and the filter.

* * * * *